Feb. 12, 1924.

C. L. WOTTRING

STALK CUTTER

Filed Dec. 30, 1921

1,483,403

Inventor
C.L. Wottring.

By William J. Jacoli
Attorney

Patented Feb. 12, 1924.

1,483,403

UNITED STATES PATENT OFFICE.

CHARLES L. WOTTRING, OF HOUSTON, TEXAS.

STALK CUTTER.

Application filed December 30, 1921. Serial No. 525,826.

*To all whom it may concern:*

Be it known that CHARLES L. WOTTRING, a citizen of the United States, residing at Houston, in the county of Harris and State of Texas, has invented certain new and useful Improvements in Stalk Cutters, of which the following is a specification.

This invention has relation to certain new and useful improvements in a stalk cutter and has for its primary object the provision of a device of this character which will be of simple construction and operation as well as highly efficient in use and which may be readily adjusted for cutting the stalks of several rows at each operation, regardless of the distance between the rows of stalks.

The invention has for another object the provision of a stalk cutter of the character stated which will be of such construction that the adjustable parts thereof may be readily regulated according to the distance between the rows of stalks to be cut and the device then operated between the rows of stalks to properly cut the same adjacent the ground and cause the stalks to fall together in a single row so that they may be readily gathered and burned or otherwise destroyed to assist in fertilizing the ground and at the same time destroying boll weevil and other enemies of cotton and similar stalk growths.

The invention has for a further object the provision of a stalk cutter of the character stated in which the side blades may be carried on the runners so as to operate adjacent the surface and cut the stalks in opposite rows as the device is moved along between parallel rows of stalks.

The invention has for a still further object the provision of a stalk cutter of the character set forth which will be constructed so as to ride along the surface and which will be provided with means for guiding the device properly and preventing side movement or slipping thereof on the surface during the operation of cutting the stalks, thereby providing a device which may be used on soft and wet ground as well as on any solid and hard surface.

The invention has for a still further object the provision of a stalk cutter of the character set forth which will be of such construction that it may be readily drawn by a single draft animal and may be employed either as a riding cutter or a walking cutter, as desired, the device being constructed so that a single operator may take care of the complete operation.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1:
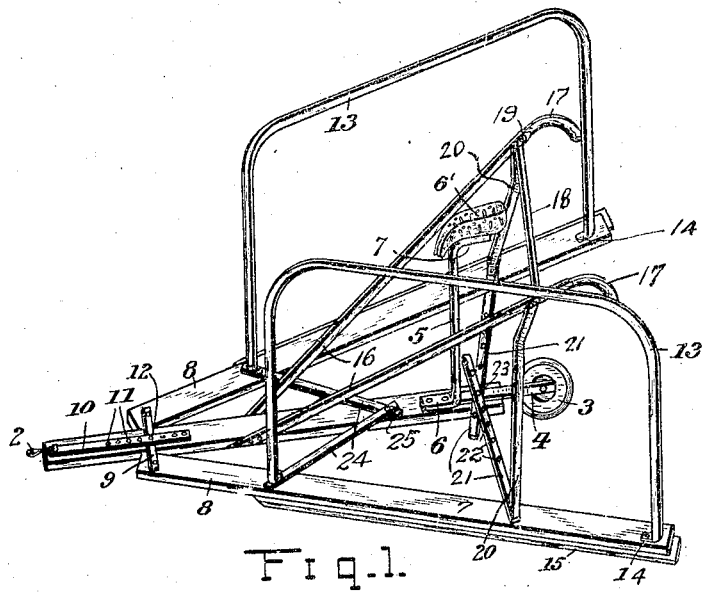
Figure 1 is a perspective view of the complete machine with the parts properly adjusted and the device ready for operation.

Referring more in detail to the drawings in which similar reference characters designate corresponding parts throughout the several views, 1 indicates the central beam upon the forward end of which the clevis 2 is mounted for connecting the draft mechanism, not shown, by means of which the draft animal may be connected with the stalk cutter for drawing the same over the surface, from which the growing stalks are to be cut.

The central beam 1 serves to support the guide wheel or disc 3 in suitable rearwardly extended supporting bracket arms 4 mounted on the rear end of the central beam 1, as shown clearly in the drawings. This guide wheel or disc 3 may serve to enter the surface and cut through the same to properly guide the cutter and prevent side movement of the same between the rows, as will be clearly understood. The seat supporting standard 5 is also mounted on the rear portion of the central standard 1 by its turned lower end 6 secured on the standard by suitable securing members, while the driver's seat 6' is mounted on the rearwardly turned upper end 7 of the standard 5, as shown clearly in Fig. 1.

On opposite sides of the central beam 1 of the cutter are located the rearwardly diverging side beams 8 which may also be termed the runners and which are adapted to ride upon the surface with the central beam 1. These side beams or runners 8 are connected at their forward end portions by the forward connecting bar 9 extended over the forward portion of the central beam 1 and beneath the adjusting plate 10 mounted thereon. This plate 10 has a plurality of spaced openings 11 arranged longitudinally thereof to receive the pivot pin 12 which also extends through the central portion of the connecting bar 9, thereby forming a loose connection between the guide beams or runners 8 and the central beam 1, it being understood that the pivot bolt 12 is extended through the proper opening 11 and after relative adjustment of the central beam 1 and the side beams or runners 8.

Figure 2:
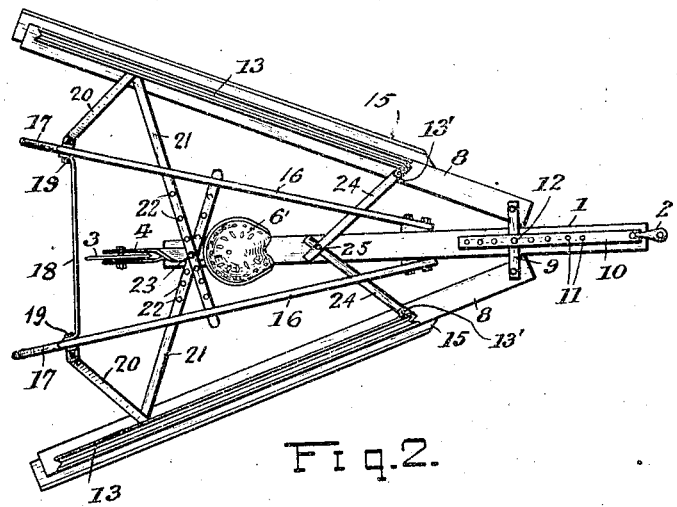
Figure 2 is a top plan view of the device as shown in Fig. 1.

Mounted upon the side beams or runners 8 are the stalk engaging and bending members or fenders 13 which are of substantially inverted U-shaped form with the lower ends of their legs bent to form angular extensions 14 and secured upon the upper face of the side beams or runners 8, as shown in Fig. 1 while the main or central portions are above and parallel with the side beams or runners 8, as shown in Figs. 1 and 2 and may be bent over outwardly of the side beams or runners 8, if desired, in order that they may properly engage the stalk and straighten the same for the cutting operation and then serve to properly force the cut stalks over so that all of them will lie in the same direction and the stalks of adjacent rows be caused to fall in a single row when cut. The stalk engaging members or fenders 13 are preferably of the size indicated in the drawings so that the members extend practically the entire length of the side beams or runners 8.

Each side beam or runner 8 carries a cutting blade 15 extending the entire distance beneath the stalk engaging members or fenders 13 with the outer longitudinal edge serving as the blade of the knife so as to assure proper cutting of the stalk. In the drawings the blade 15 is shown as being secured upon the under face of the side beams or runners 8, although these blades may be positioned on the upper faces thereof, if desired. This may be preferred when a device is designed for use on surfaces where many stones and other obstructions are found, so as to prevent unnecessary damage to the cutting edges of the blades or the knives 15.

The handle members 16 are secured at their lower portions to opposite sides of the central beam 1, near the forward end of the latter. These handle members 16 extend rearwardly and upwardly and have the upper extremities thereof curved downwardly to form the handles 17, by means of which the device may be operated as a walking cutter or walking stalk cutter. These handle members 16 are connected by a transverse bracing member 18 near the handles 17. This bracing member 18 is shown as being in the form of a bracing bar with the opposite end portions turned at an angle and secured to two of said handle members 16 by suitable securing members 19. These securing members 19 also have mounted thereon the upper extremities of the bracing bars 20 or the central members 1. The upper portions of these bracing members 20 are turned at an angle to the main portions thereof, as shown in the drawings and these main portions of the bracing members 20 are extended downwardly and outwardly and secured at their lower extremities on the transverse adjusting bars 21. The adjusting bars 21 are carried on the rear portions of the side beams or runners 8, as shown clearly in the drawings and have the spaced openings 22 along their greater portions so that these members 21 may be crossed over the rear end portions of the central beam 1 and secured on the adjusting bolt 23 passed through registering openings 22 of the adjusting bars 21 and into the central beam 1. It will therefore be evident that the side beams or runners 8 may be readily adjusted to vary the distance between the same according to the distance between the rows of standing stalks to be cut.

As further bracing means for the stalk cutter, I have provided the bracing bars 24 which are pivoted at their outer ends upon the forward portions of the side beams or runners 8 while their inner ends are crossed over the central beam 1 and secured thereto by a pivot bolt 25 after being extended inwardly and rearwardly, as will be evident by referring to the drawings. If desired, however, the pivot bolt 25 may be extended only through the bracing bars 24 and not through the central beam 1. This is also true of the pivot bolt 23 for the adjusting bars 21. By referring to the drawings, particularly Fig. 1, it will be seen that the bracing bars 24 are shown as having their outer or forward ends positioned so as to be mounted at the forward lower end on the frame securing members as provided for securing the forward ends of the stalk engaging and bending members or fenders 13 upon the side beams or runners 8. It is believed that the complete construction and operation of this stalk cutter may now be readily understood by referring to the foregoing paragraphs in connection with the accompanying drawings without further detailed description. It may be stated briefly, however, that after proper adjustment of the parts as described, according to the distance between the standing stalks, the device may be readily operated by a single attendant to cut down two rows of stalks at a time, thereby making it possible to cut down four rows of stalks on each round and drop the stalks into two rows, owing to the action of the stalk engaging and bending members or fenders 13. It is believed that parties familiar with this art may now readily understand the operation of this device whether employed as a riding stalk cutter or a walking stalk cutter. In either case, the wheel or disc 3 may travel in the ground and serve to properly guide the stalk cutter and prevent side movement or slipping of the same.

While the preferred embodiment of the invention has been shown and described, it is to be understood that minor changes in the details of construction and arrangement of parts may be resorted to within the scope of what is claimed without departing from the spirit of the invention.

What I claim is:—

1. A stalk cutter comprising a central beam, side beams adjustable upon said central beam and diverging rearwardly therefrom, said side beams serving as runners, stalk cutting blades carried by said runners, draft element attaching means carried on said central beam, a guide member carried on said central beam, a driver's seat mounted on said central beam, means for securing said side beams in adjusted position, and stalk engaging fenders carried by said side beams and extending upwardly therefrom.

2. A stalk cutter comprising a central beam, side beams mounted on said central beam and serving as runners, stalk cutting blades carried by said runners, stalk engaging fenders mounted on said runners, and a guiding element mounted on said central beam to prevent side slipping of said stalk cutter when in operation, and means for adjusting said runners independently at their rear ends.

3. A stalk cutter comprising a central beam, draft element attaching means carried by said central beam, side beams diverging from one another and serving as runners for the stalk cutter, means for connecting the forward converged ends of said side beams on opposite sides of said central beam and adjusting the side beams longitudinally of said central beam, a guide disc suspended from the rear end of said central beam to prevent side slipping of the stalk cutter while in operation, means connecting the rear portions of said runners and retaining the same in adjusted position with respect to one another and with respect to the rear end portions of the central beam, bracing means for said side runners, stalk cutting blades carried by said runners, fenders mounted on said runners, a driver's seat for said stalk cutters mounted on the central beam thereof, and guide handles connected with said central beam and with the connecting means for the rear end portions of said side runners, and means for bracing said guide handles.

4. A stalk cutter comprising a central beam, draft element attaching means carried on one end of said central beam, a guide disc carried on the opposite end of said central beam and adapted to enter the surface over which the stalk cutter is operated to prevent side slipping of said stalk cutter, diverging side beams connected with said central beam and serving as runners for the stalk cutter, said side runners being adapted to be adjusted to vary the distance between the diverging ends thereof, stalk cutters carried by said runners, stalk engaging fenders carried by said runners and extending upwardly therefrom, said fenders comprising a U-shaped member having their free ends secured to said runners.

In testimony whereof I affix my signature.

CHARLES L. WOTTRING.